(12) United States Patent  
Sood

(10) Patent No.: US 12,328,629 B2
(45) Date of Patent: Jun. 10, 2025

(54) SYSTEM AND METHOD FOR DEVICE MANAGEMENT TO RESTRICT HANDOVER

(71) Applicant: T-Mobile Innovations LLC, Overland Park, KS (US)

(72) Inventor: Romil Sood, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 413 days.

(21) Appl. No.: 17/867,802

(22) Filed: Jul. 19, 2022

(65) Prior Publication Data

US 2024/0031885 A1   Jan. 25, 2024

(51) Int. Cl.
*H04W 36/00* (2009.01)
*H04W 48/18* (2009.01)
*H04W 60/06* (2009.01)
*H04W 76/50* (2018.01)

(52) U.S. Cl.
CPC ....... *H04W 36/0083* (2013.01); *H04W 48/18* (2013.01); *H04W 60/06* (2013.01); *H04W 76/50* (2018.02)

(58) Field of Classification Search
CPC . H04W 36/0083; H04W 48/18; H04W 60/06; H04W 76/50; H04W 36/0022; H04W 76/18
USPC ........................................................ 455/436
See application file for complete search history.

(56) References Cited

U.S. PATENT DOCUMENTS

| | | | |
|---|---|---|---|
| 6,920,326 B2 | 7/2005 | Agarwal et al. | |
| 9,432,928 B1* | 8/2016 | Keller | H04W 48/10 |
| 2015/0195757 A1* | 7/2015 | Tietz | H04W 36/08 455/438 |
| 2016/0373984 A1* | 12/2016 | Hara | H04W 36/0085 |
| 2021/0153087 A1 | 5/2021 | Lee et al. | |
| 2023/0156547 A1* | 5/2023 | Lei | H04W 36/14 455/434 |
| 2023/0284108 A1* | 9/2023 | Abtin | H04W 48/04 370/331 |
| 2023/0354029 A1* | 11/2023 | Ahmet | H04W 12/08 |
| 2023/0397064 A1* | 12/2023 | Babaei | H04W 36/0085 |
| 2024/0064580 A1* | 2/2024 | Kim | H04W 48/20 |

* cited by examiner

*Primary Examiner* — Don N Vo
(74) *Attorney, Agent, or Firm* — Jones Robb, PLLC

(57) ABSTRACT

Systems, methods, and process nodes for managing device connections in a first telecommunications network perform and/or comprise: receiving a handover connection request from a wireless device via a second telecommunications network; requesting an allowlist from a database associated with the first telecommunications network; determining, based on a content of the handover connection request and the allowlist, whether the wireless device is capable of performing a communication technique associated with the first telecommunications network; and in response to a determination that the wireless device is not capable of performing the communication technique, performing a denial operation with regard to the wireless device.

17 Claims, 5 Drawing Sheets

SYSTEM AND METHOD FOR DEVICE MANAGEMENT TO RESTRICT HANDOVER

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR). Telecommunications networks provided by different network operators generally overlap, such that a given geographical area may be served by multiple network operators each providing their own network services.

Newer generations of RATs may provide additional wireless services not present in older generations. One example of a wireless service provided by newer RATs is voice-over-data, such as Voice-over-LTE (VoLTE) or Voice-over-NR (VoNR). Voice-over-data provides for systems and methods of providing voice services over RATs which implement packet switching (e.g., data networks). This allows simultaneous voice and data services on compatible wireless devices, may result in improved battery efficiency by reducing the need for switching networks in order to provide voice services, expands the geographical range of network service by permitting voice services over Wi-Fi networks, and may improve the quality of voice communications.

Another example of a wireless service provided by newer RATs in the United States is Enhanced 911 (E911). "911" is the universal telephone number for emergency services in the United States; thus, any user of a wired or wireless telephone may simply dial 9-1-1 to be connected to an emergency services operator at a Public Safety Answering Point (PSAP). For wired telephones, E911 extends base 911 capabilities by automatically reporting the telephone number and fixed location for the caller. Wireless telephones, however, do not have a fixed location. The Federal Communications Commission (FCC) has mandated that wireless network operators implement E911 on their networks, thereby to provide an accurate location for 911 calls from wireless devices. Under Phase II of the FCC's E911 implementation current and future rules, this location must be accurate within fifty to 300 meters in the latitude and longitude directions and, in some regions, within three meters in the vertical direction. Different networks implement or plan to implement location acquisition and reporting using different methods or combinations of methods, including access point triangulation using round-trip time, angle of signal arrival or departure, and/or time differential of signal arrival; geopositioning using sensors such as Global Positioning System (GPS) sensors; environmental characteristics such as barometric pressure; and so on.

As newer generations of RATs, such as 5G RATs, gain more widespread adoption, some network operators have begun to (or have announced plans to) shut down portions of their networks which implement older RATs, such as 2G and/or 3G RATs. As a result, older wireless devices may be migrated to newer RATs.

Overview

Various aspects of the present disclosure relate to systems and methods of managing device connections in a network, such as device attach and device handover requests in a telecommunications network.

In one exemplary aspect of the present disclosure, a method of managing device connections in a first telecommunications network comprises: receiving a handover connection request from a wireless device via a second telecommunications network; requesting an allowlist from a database associated with the first telecommunications network; determining, based on a content of the handover connection request and the allowlist, whether the wireless device is capable of performing a communication technique associated with the first telecommunications network; and in response to a determination that the wireless device is not capable of performing the communication technique, performing a denial operation with regard to the wireless device.

In another exemplary aspect of the present disclosure, a system for managing device connections in a first telecommunications network comprises: a first access node corresponding to the first telecommunications network; and at least one electronic processor operatively coupled to the first access node, the at least one electronic processor configured to perform operations including: receiving a handover connection request from a wireless device via a second access node corresponding to a second telecommunications network; requesting an allowlist from a database associated with the first telecommunications network; determining, based on a content of the handover connection request and the allowlist, whether the wireless device is capable of performing a communication technique associated with the first telecommunications network; and in response to a determination that the wireless device is not capable of performing the communication technique, performing a denial operation with regard to the wireless device.

In another exemplary aspect of the present disclosure, a processing node in a first telecommunications network is configured to perform operations comprising: receiving a handover connection request from a wireless device via a second telecommunications network; requesting an allowlist from a database associated with the first telecommunications network; determining, based on a content of the handover connection request and the allowlist, whether the wireless device is capable of performing a communication technique associated with the first telecommunications network; and in response to a determination that the wireless device is not capable of performing the communication technique, performing a denial operation with regard to the wireless device.

In this manner, these and other aspects of the present disclosure provide for improvements in at least the technical field of telecommunications, as well as the related technical fields of network connection management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
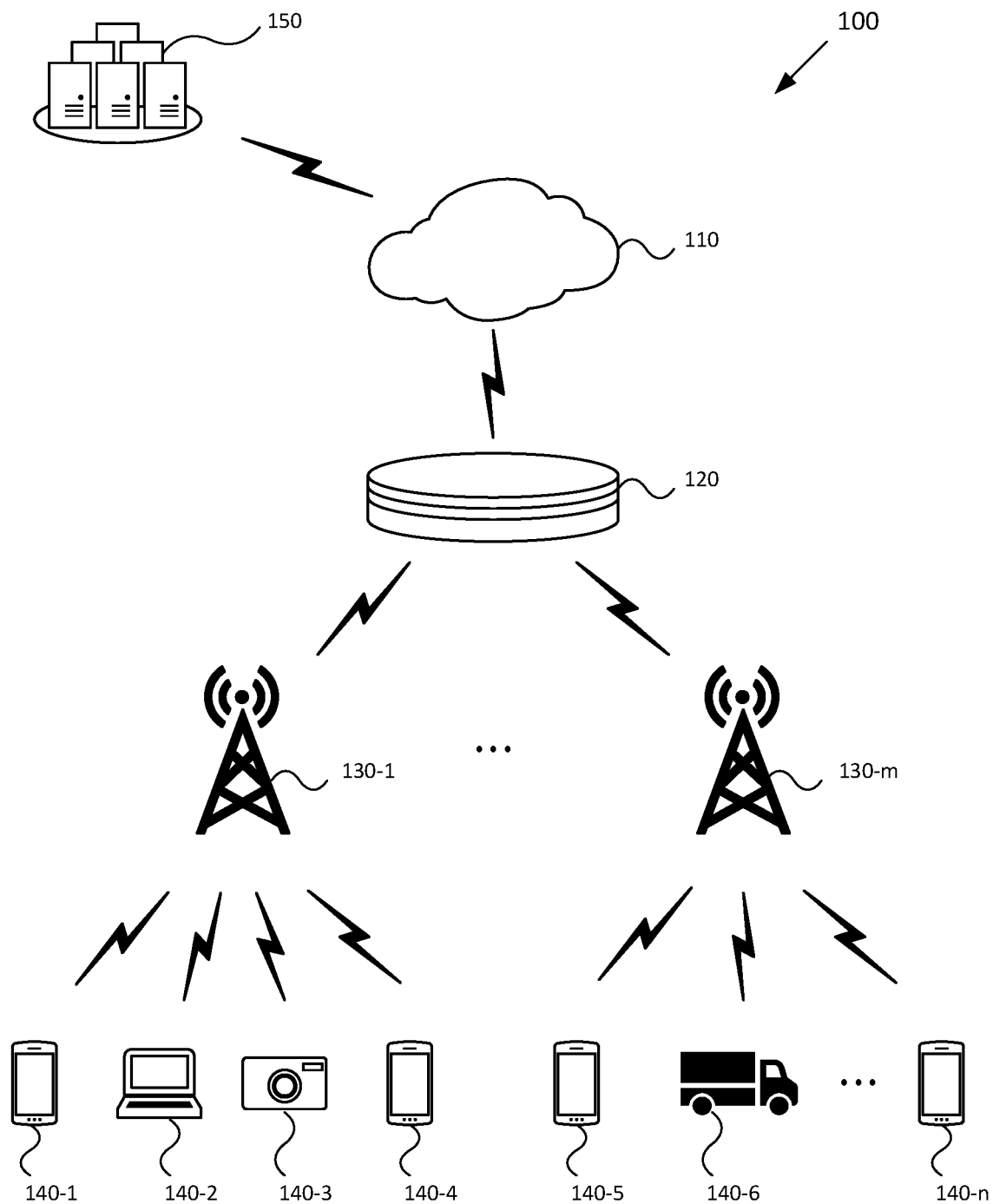
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

As noted above, newer generations of RATs may provide additional wireless services, such as VoLTE/VoNR and E911, not present in older generations. Network providers may be or may become required (for example, by law and/or by regulation) to provide access to some of these additional services to all connected devices. For example, a network operator may be required to provide all connected devices with the ability to contact emergency services. However, if a wireless device is not compatible with these additional services, the wireless device may be incapable of contacting emergency services using, for example, the E911 service. Even where such connectivity is not mandated, network operators may wish to prevent access by devices which are incapable of contacting emergency services for other reasons.

As also noted above, some network operators have begun to (or have announced plans to) shut down portions of their networks which implement older RATs, such as 2G and/or 3G RATs, thus providing communications services only through newer RATs, which may be voice-over-data-only, such as VoNR-only or VoLTE-only (e.g., Enhanced Packet Core (EPC) networks). As a result, older wireless devices may be migrated to other networks. For example, older wireless devices that are no longer compatible with one network operator's remaining networks may attempt to obtain network services by roaming on another network operator's networks. However, these devices may not be VoLTE/VoNR capable and/or may not be E911 capable, and therefore may be unable to contact emergency services even if connected to a network.

If a wireless device that is not VoLTE/VoNR capable were to connect via a VoLTE/VoNR-only network, the wireless device may have data access but will not have voice access. Because the wireless device does not have access to voice services, the wireless device will be unable to make emergency calls. If a wireless device that is non E911 capable were to connect to such a network, the wireless device may use VoLTE/VoNR for both data and voice access. However, because the wireless device is not E911 capable, the wireless will still be incapable of emergency calling. Therefore, it may be necessary or desirable to restrict these devices on the network, either for regulatory, technological, or other reasons.

Thus, various aspects of the present disclosure may operate in situations where a wireless device associated with one network attempts to roam on another network. By providing a system and method to dynamically restrict and/or permit connection requests based on attributes of a network and/or capabilities of a wireless device the present disclosure may provide a standard solution to prevent non-compliant device types from connecting to certain networks, thereby facilitating regulatory compliance, ensuring device-network compatibility, providing increased service flexibility, and the like.

The terms "wireless device" or "mobile device" refer to any wireless device included in a wireless network. For example, the terms "wireless device" or "mobile device" may include a relay node, which may communicate with an access node. The terms "wireless device" or "mobile device" may also include an end-user wireless device, which may communicate with the access node through the relay node. The terms "wireless device" or "mobile device" may further include a UE or end-user wireless device that communicates with the access node directly without being relayed by a relay node. Additionally, "wireless device" or "mobile device" may encompass any type of wireless device, such as a smartphone, a tablet, a laptop computer, and so on. A "restricted wireless device" or "restricted mobile device" is a device that is incapable of contacting emergency services through a network, or otherwise incompatible with an voice-over-data-only network.

A wireless device may be identified by a unique code assigned by the network operator or assigned by the device manufacturer. One example is a manufacturer-assigned fifteen-digit identifier referred to as an International Mobile Equipment Identity (IMEI). The IMEI is formed of an eight-digit Type Allocation Code (TAC), followed by an eight-digit manufacturer-defined serial number corresponding to the particular wireless device, and finally followed by a check digit. The TAC identifies the manufacturer and model of a wireless device. As such, the TAC may in some cases be used as a proxy for or indicator of the wireless device capabilities. Another example is a manufacturer-assigned sixteen-digit identifier referred to as an International Mobile Station Equipment Identity Software Version (IMEISV). The IMEISV is formed of the same eight-digit TAC followed by the same eight-digit manufacturer-defined serial number, but followed by a two-digit software version number (SVN) identifier instead of the check digit. In cases where the TAC is not sufficient to be used as a proxy for or indicator of the wireless device capabilities (e.g., where a certain model of wireless device has different capabilities enabled by later software releases), the SVN may additionally or alternatively be used as the proxy or indicator. The IMEI and/or IMEISV may be stored in the wireless device and/or an associated storage medium (e.g., a SIM card).

For purposes of illustration and explanation, various portions of this detailed description refer to a system in which the both the home network and the roaming network of the wireless device operate using a 5G RAT; however, the present disclosure is not so limited. The systems and methods described herein may be implemented in any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform, may perform processing and forward results to the computing systems and devices 150 and/or the wireless devices 140. The core network 120, which may be an NR core network, connects with the cloud platform 110 and the access nodes 130. While not explicitly shown, for LTE communication, the core network 120 may be implemented on a fixed-function, hard-wired architecture. Examples of the core network and/or the access nodes 130 will be described in more detail below with respect to FIGS. 2 and 3. Subsets of the access nodes 130 may be respectively configured to provide service in different areas, on different bands, for different RATs, and so on.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4. The system 100 of FIG. 1 illustrates a network for only a single network operator, but it will be understood that generally a single geographical area may correspond to multiple networks for multiple different network operators.

Figure 2:
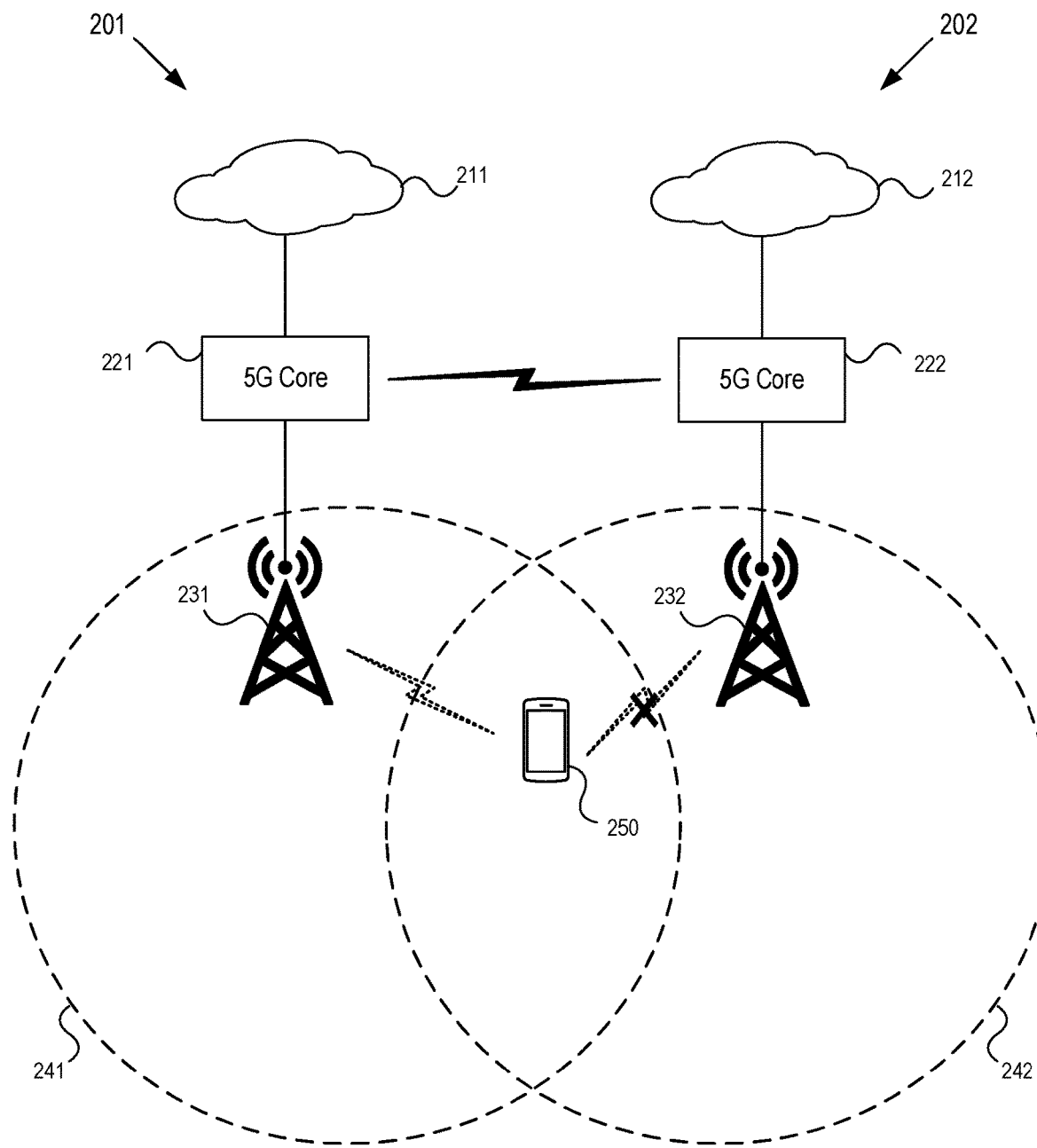
FIG. 2 illustrates an exemplary configuration of a system for wireless communication in accordance with various aspects of the present disclosure

FIG. 2 illustrates a configuration in which two networks, each corresponding to a different network operator, are present in the same area. For purposes of illustration and explanation, the two networks are illustrated as NR networks; however, in practical implementations each network may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

A first network system 201 comprises a first communication network 211, a first 5G core 221, and a first access node 231 which provides service in a first coverage area 241. A second network system 202 comprises a second communication network 212, a second 5G core 222, and a second access node 232 which provides service in a second coverage area 242. A wireless device 250 is present, which may be associated with the second network system 202 as a home network and with the first network system 201 as a roaming network. Any number of additional wireless devices may be connected to the first communication network 211 via the first access node 231 and/or to the second communication network 212 via the second access node 232; however, these additional wireless devices are omitted from FIG. 2 for clarity.

The first 5G core 221 and the second 5G core 222 are capable of communicating with one another, for example by respective Diameter Edge Agents (DEAs) thereof. While the first coverage area 241 and the second coverage area 242 are illustrated as being substantially similar in size and partially overlapping for purposes of illustration and explanation, the present disclosure is not so limited. In practice, the first coverage area 241 and/or the second coverage area 242 may each have any size, shape, directionality, etc. The first coverage area 241 may be subsumed within the second coverage area 242 or vice versa. There may exist no overlap between the first coverage area 241 and the second coverage area 242, so long as the DEA of the first 5G core 221 and the DEA of the second 5G core 222 are capable of communicating with one another.

For purposes of illustration and ease of explanation, only one access node is shown for each network system; however, as noted above with regard to FIG. 1, additional access nodes and/or additional or fewer wireless devices may be present in the first network system 201 and/or the second network system 202. In the illustration of FIG. 2, the first access node 231 is connected to the first communication network 211 via an NR path (including the first 5G core 221); however, in practical implementations the first access node 231 may be connected to the first communication network 211 via multiple paths (e.g., using multiple RATs). Similarly, while the second access node 232 is shown as being connected to the second communication network 212 via an NR path (including the second 5G core 222), in practical implementations the second access node 232 may be connected to the second communication network 212 via multiple paths. The first and second access nodes 231 and 232 respectively communicate with the first and second 5G cores 221 and 222 via one or more communication links, each of which may be a direct link (e.g., an X2 link, a S1 link or the like). The first access node 231 and/or second access node 232 may also communicate with additional access nodes via a direct link.

Scheduling entities may be located within the first access node 231, the second access node 232, the first 5G core 221, and/or the second 5G core 222. Where present, a scheduling entity may be configured to accept and deny connection requests and manage communication sessions, as will be described in more detail below. The first access node 231 and/or the second access node 232 may be any network node configured to provide communications between the connected wireless device(s) and the corresponding communication network, including standard access nodes and/or short range, lower power, small access nodes. As examples of a standard access node, either/both access node may be a macrocell access node, a base transceiver station, a radio base station, a gNodeB in 5G networks, an eNodeB in 4G/LTE networks, or the like, including combinations thereof. In one particular example, the first and/or second access node 231 and/or 232 may be a macrocell access node in which a range of the first and/or second coverage area 241 and/or 242 is from approximately five to thirty-five kilometers (km) and in which the output power is in the tens of watts (W). As examples of a small access node, either/both access node may be a microcell access node, a picocell access node, a femtocell access node, or the like, including a home gNodeB or a home eNodeB.

The first and/or second access node 231 and/or 232 can comprise one or more processors and associated circuitry to execute or direct the execution of computer-readable instructions such as those described herein. In so doing, the first and/or second access node 231 and/or 232 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the first and/or second access node 231 and/or 232 can receive instructions and other input at a user interface.

A roaming controller may be located within the first access node 231, the second access node 232, the first 5G core 221, and/or the second 5G core 222, and may be in communication with the DEA of the corresponding 5G core. The roaming controller is a processing node in accordance with the present disclosure which controls roaming device connections, for example by performing roaming acceptance operations and/or roaming denial operations.

Figure 3:
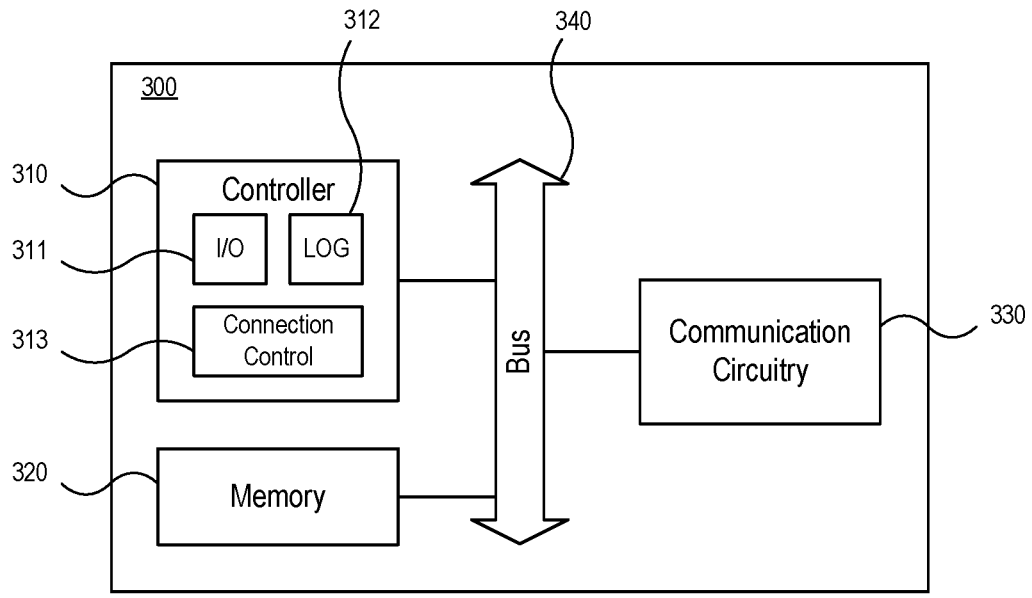
FIG. 3 illustrates an exemplary processing node in accordance with various aspects of the present disclosure.

FIG. 3 illustrates one example of a processing node 300, which may correspond to one or more of the access nodes 130 or a component of the core network 120 shown in FIG. 1, and/or the first and/or second access node 231/232 or a component of the first and/or second 5G cores 211/212 shown in FIG. 2. The processing node 300 corresponds to a first telecommunications network in an area where multiple telecommunications networks are in operation. In some examples, the first telecommunications network is a voice-over-data-only network (e.g., a VoLTE-only network or a VoNR-only network). As illustrated the processing node 300 includes a controller 310, a memory 320, communication circuitry 330 which may include wired and/or wireless communication circuitry, and a bus 340 through which the various elements of the processing node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like, or combinations thereof. These sub-modules or units include but are not limited to an input/output (I/O) module 311, a logic module 312, and a connection control module 313. In practical implementations, additional sub-modules or units may be provided.

Thus, the processing node 300 may implement a system and/or method to manage device connections in a telecommunications network associated with the processing node 300. The I/O module 311 may be configured to receive a connection request, such as a handover connection request, from a wireless device seeking to join the first telecommunications network, either directly or via another intermediate element (such as a processing node in a second telecommunications network, wherein the first and second telecommunications networks are operated by different network operators) and in either a wired or wireless manner via the communication circuitry 330. The connection request may further include a capability report of the wireless device or be followed by the capability report. The capability report may be or include identifying information of the wireless device which the processing node 300 may use for the determination. This identifying information includes, but is not limited to, an IMEI, and IMEISV, a TAC, or combinations thereof. The connection request may further include service requests, such as an Update Location Request (ULR). The I/O module 311 may additionally or alternatively be configured to request and receive data relevant to a determination regarding whether to accept the connection request, such as an allowlist. The allowlist may be a data structure which includes a list of identifying information regarding devices which are allowed to access the telecommunications network or which are not blocked from accessing the telecommunications network. For example, the allowlist may be a data structure which includes a list of allowed IMEIs, IMEISVs, TACs, or combinations thereof. The allowlist may be requested and received from a database associated with the first telecommunications network. The database may be included in the processing node 300 (e.g., in the memory 320) or may instead be present in a separate entity in the first telecommunications network.

The logic module 312 may be configured determine whether the wireless device is capable of performing a communication technique (e.g., a voice-over-data technique or an E911 technique). The determination may be based on a content of the handover connection request (e.g., data included in the capability report) and the allowlist. For example, the logic module 312 may be configured to compare a portion of an IMEISV corresponding to the wireless device (e.g., an SVN and/or a TAC) to the allowlist. If the portion of the IMEISV is not present in the allowlist, the logic module 312 may be configured to determine that the wireless device is not capable of performing the communication technique. If, however, the portion of the IMEISV is present in the allowlist, the logic module 312 may be configured to determine that the wireless device is capable of performing the communication technique.

The connection control module 313 may be configured to perform connection control operations with regard to the wireless device, including denial operations in response to a determination (e.g., by the logic module 312) that the wireless device is not capable of performing the communication technique and/or and acceptance operations in response to a determination (e.g., by the logic module 312) that the wireless device is capable of performing the communication technique. The denial operations may include deregistering the wireless device from the first telecommunications network and/or transmitting an error code to the second telecommunications network. The acceptance operation may include accepting the handover connection request.

The I/O module 311, the logic module 312, and the connection control module 313 are illustrated as residing within the controller 310 for ease of explanation; however, one or more of the units may instead reside within the memory 320 and/or may be provided as separate units within the processing node 300. Moreover, while the I/O module 311, the logic module 312, and the connection control module 313 are illustrated as separate units, in practical implementations some or all of the units may be combined and/or share components.

The communication circuitry 330 may include circuit elements configured for inbound communication to receive wireless signals (e.g. one or more antennas) as well as interface elements configured, for example, to translate data signals from wireless input into control or other signals for the controller 310. Moreover, the communication circuitry 330 may include circuit elements configured for outbound communication to generate wireless signals (e.g., one or more antennas) as well as interface elements configured, for example, to translate control signals from the controller 310 into data signals for wireless output. For example, the processing node 300 may be configured to receive connection requests, such as handover connection requests, via the wireless portion of the communication circuitry 330 and output connection determinations and/or perform connection control operations via the wireless communication circuitry portion of the 330, thereby allowing or denying the connection requests. The processing node 300 may include additional wireless communication circuitry elements, for example to communicate using and/or to provide connectivity for different RATs. The processing node 300 may further include additional wired communication circuitry elements.

Figure 4:
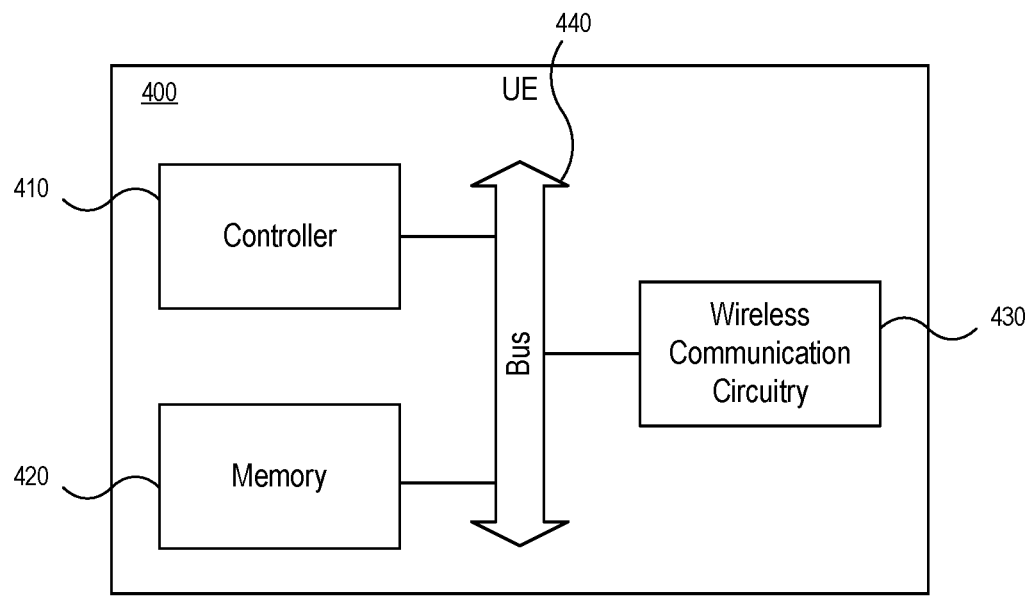
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or the wireless device 250 shown in FIG. 2. As illustrated, the wireless device 400 includes a controller 410, a memory 420, a wireless communication circuitry 430, and a bus 440 through which the various elements of the wireless device 400 communicate with one another. The controller 410 may include various sub-modules or units to implement operations and processes in accordance with the present disclosure; for example to respond to queries/commands. Such sub-modules or units may physically reside within the controller 410, may reside within the memory 420, and/or may be provided as separate units within the wireless device 400.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses via the wireless communication circuitry 430, the responses indicating whether the connection requests have been accepted or denied. The wireless device 400 may include additional wireless communication circuitry elements, for example to communicate using different RATs.

Returning to FIG. 2, the first communication network 211 and/or the second communication network 212 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The first communication network 211 and/or the second communication network 212 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the first communication network 211 and/or the second communication network 212 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The first communication network 211 and/or the second communication network 212 may also comprise additional base stations, controller nodes, telephony switches, internet routers, network gateways, computer systems, communication links, other types of communication equipment, and combinations thereof.

The communication links connecting the first access node 231 to the first 5G core 221 and/or the second access node 232 to the second 5G core 222 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links may respectively be a direct link or might include various equipment, intermediate components, systems, and networks. The communication links may comprise many different signals sharing the same link.

The first network system 201 and the second network system 202 are illustrated as 5G networks for explanation only, and in practical implementations one or both of the network systems may be LTE networks. In a 5G network, a respective network system may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), an Access and Mobility Management Function (AMF), a Session Management Function (SMF), and an Authentication Server Function (AUSF). The user plane NFs include but are not limited to a Unified Data Repository (UDR) and a User Plane Function (UPF). Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the corresponding 5G core. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the corresponding 5G core, thereby terminating RAN control plane and UE traffic originating on either the N1 or N2 reference interface. In the corresponding 5G core, the functionality of the 4G MME is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

In an LTE network, a respective network system may include gateway nodes and controller nodes. A gateway node may be any network node configured to interface with other network nodes using various protocols. The gateway node can communicate user data over the network system. The gateway node may be a standalone computing device, computing system, or network component, and can be accessible by, for example, a wired or wireless connection, or through an indirect connection such as via a computer network or communication network. The gateway node may include but is not limited to a serving gateway (SGW) and/or a public data network gateway (PGW). The gateway node is not limited to any specific technology architecture, such as LTE or 5G NR, but may be used with any network architecture and/or protocol.

The gateway node can comprise a processor and associated circuitry to execute or direct the execution of computer-readable instructions to obtain information. In so doing, the gateway node can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node can receive instructions and other input at a user interface.

A controller node may be any network node configured to communicate and/or control information over the LTE network system. The controller node may be configured to transmit control information. The controller node may be a standalone computing device, computing system, or network component, and can be accessible by, for example, a wired or wireless connection, or through an indirect connection such as via a computer network or communication network. The controller node may include but is not limited to a Mobility Management Entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, and the like.

Other network elements may be present in the network system(s) to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the first and/or second access node 231/232 and the first and/or second communication network 211/212.

FIG. 2 illustrates a situation in which, for example, a network operator of the second network system 202 has shut down 2G/3G services. In the illustrated example, the wireless device 250 may be an older device which does not support VoLTE, VoNR, and/or E911 and which may be incapable of connecting to the remaining RATs provided by the network operator, such as the particular 5G service provided by the second access node 232. Thus, the wireless device 250 may seek to join the first network system 201 by roaming with the network operator thereof. This may be possible where the first access node 231 provides communication services via 2G/3G in addition to 5G, or is otherwise technologically compatible with the communication capabilities of the wireless device 250. This may be referred to as a handover from the second network system 202 to the first network system 201.

Figure 5:
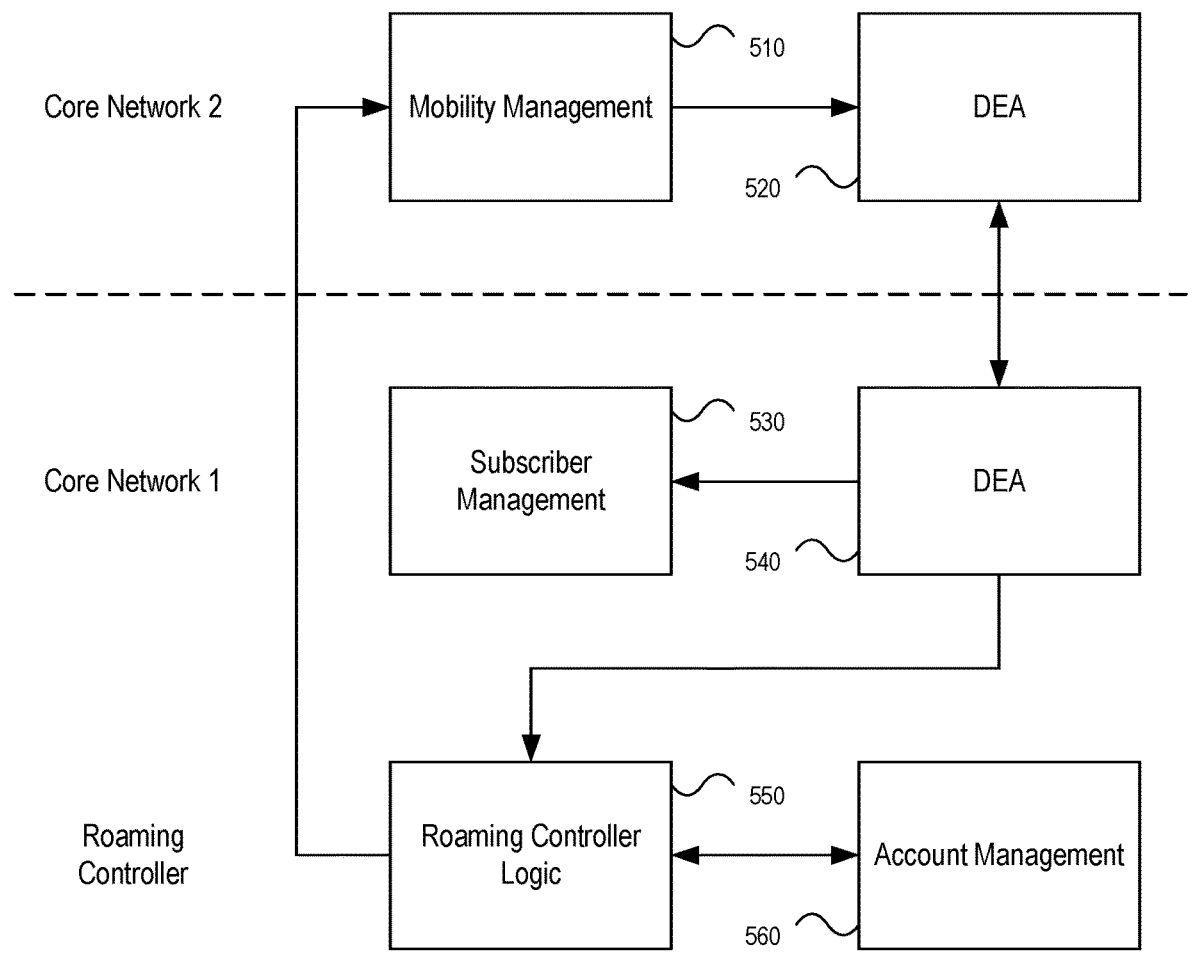
FIG. 5 illustrates an exemplary communication flow between network systems in accordance with the present disclosure.

To facilitate handover, as noted above, the first network system 201 and the second network system 202 are capable of communicating with one another, for example via the first 5G core 221 and the second 5G core 222. FIG. 5 illustrates one example of a communication flow between the network systems. In FIG. 5, only a portion of the network components are shown for ease of explanation; in particular, a roaming controller (which may correspond to the processing node 300 shown in FIG. 3), a first core network (which may correspond to the first 5G core 221 shown in FIG. 2), and a second core network (which may correspond to the second 5G core 222 shown in FIG. 2). However, it will be understood that the communication flow of FIG. 5 may take place between two fully-formed network systems as shown in FIG. 2.

Of the second core network, only a mobility management component 510 and a second DEA 520 are shown. The mobility management component 510 may be an MME in LTE networks and may be an AMF and/or SMF in 5G networks. Of the first core network, only a subscriber management component 530 and a first DEA 540. The subscriber management component 530 may be an HSS in LTE networks and may be a UDM in 5G networks. The roaming controller includes roaming controller logic component 550 and an account management component 560, and may be a part of the second core network or may be a separately-provided entity. In one particular example, the roaming controller logic component 550 may correspond to or reside in the logic module 312 shown in FIG. 3, and the account management component 560 may correspond to or reside in the memory 320 shown in FIG. 3.

The mobility management component 510 of the second core network may transmit a message via the second DEA 520 to the first DEA 540. This message may include data indicative of the capabilities of the wireless device seeking handover and/or may include request messages, such as a ULR. The first DEA 540 may query the subscriber management component 530 to determine whether the wireless device has been authenticated. The first DEA 540 may also transmit a copy of the message (i.e., the message received from the second DEA 520) to the roaming controller logic component 550.

The roaming controller logic component 550 may be configured to perform logical operations and to transmit messages and/or requests. For example, the roaming controller logic component 550 may be configured to send an Insert subscriber Data Request (IDR) to the account management component 560 or to another network entity. The IDR may be used to perform discovery of information regarding the wireless device, such as its SVN and/or TAC. Thus, the roaming controller logic component 550 and/or the account management component 560 may maintain an allowlist of non-blocked device information (e.g., TACs, SVNs, IMEIs, IMEISVs, or combinations thereof). The roaming controller logic component 550 may include logic to check the device information against the allowlist. If the wireless device is allowlisted, the roaming controller logic component 550 may take no further action and thus may allow the handover to proceed. If the wireless device is not allowlisted, the roaming controller logic component 550 may perform a connection denial operation. This may include sending a message or error code, such as a Cancel Location Request (CLR) to the mobility management component 510, either directly or via the first and second DEAs 540/520. This may additionally or alternatively include deregistering the wireless device from the first core network.

Figure 6:
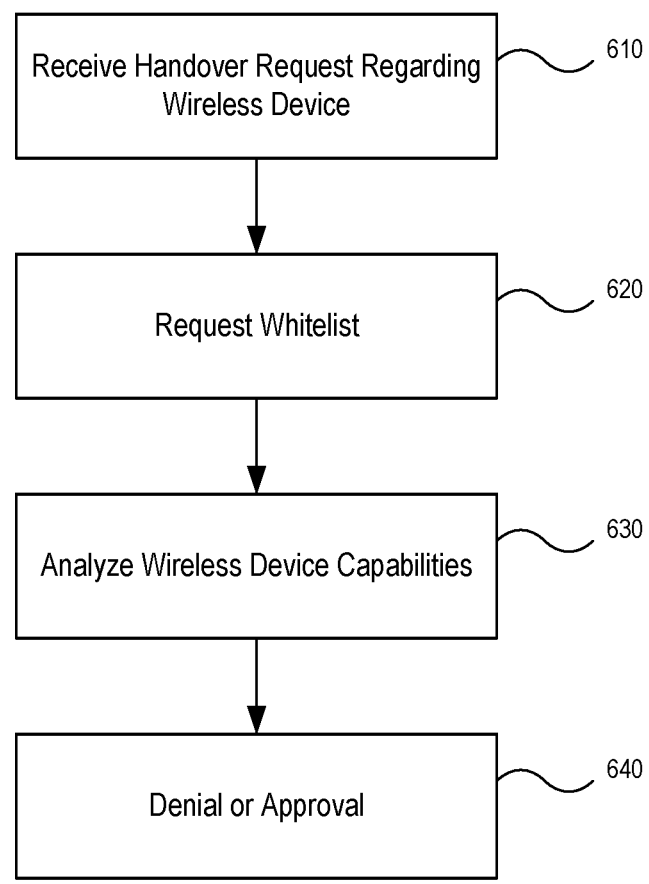
FIG. 6 illustrates an exemplary process flow for managing device connections in accordance with various aspects of the present disclosure.

Devices or systems in accordance with various aspects of the present disclosure may perform various operations to dynamically determine access to or allocation of common resource blocks. An exemplary methods including these operations are illustrated in FIG. 6. For purposes of explanation, the method of FIG. 6 will be described as being performed in the processing node 300 (which is a part of a first telecommunications network and may be synonymous with the roaming controller logic component 550) and as corresponding to the wireless device 400; however, this is merely exemplary and not limiting. The first telecommunications network may be a voice-over-data-only network.

At operation 610, the processing node 300 receives a handover connection request regarding the wireless device 400. The handover request may be received via a second telecommunications network operated by a different network operator as compared to the first telecommunications network. The handover request may include a capability report of the wireless device or be followed by the capability report. The capability report may be or include identifying information of the wireless device which the processing node 300 may use for the determination. This identifying information includes, but is not limited to, an IMEI, and IMEISV, a TAC, or combinations thereof. The connection request may further include service requests, such as an Update Location Request (ULR).

At operation 620, the processing node 300 requests an allowlist from a database associated with the first telecommunications network. The allowlist may include identifying information of devices deemed capable of performing a particular communication technique, such as voice-over-data (e.g., VoLTE or VoNR) and/or E911 techniques. For example, the allowlist may include a list of approved SVNs, TACs, and the like. At operation 630, the processing node 300 analyzes the wireless device capabilities, for example by comparing data received in or with the handover request with data in the allowlist. By analyzing the wireless device capabilities, the processing node 300 may determine, based on a content of the handover request and the allowlist, whether the wireless device is capable of performing the communication technique associated with the first telecommunications network. Operation 630 may include comparing a portion of an IMEISV corresponding to the wireless device (e.g., an SVN and/or a TAC) to the allowlist.

In response to the analysis of operation 630, at operation 640 the processing node 300 performs a denial or approval operation as appropriate. For example, if operation 630 results in a determination that the wireless device is not capable of performing the communication technique, operation 640 may include performing a denial operation. The denial operation may include deregistering the wireless device from the first telecommunications network and/or transmitting an error code or other denial message to the second communications network. On the other hand, if operation 630 results in a determination that the wireless device is capable of performing the communication technique, operation 640 may include performing an approval operation. The approval operation may include accepting the handover connection request or, in some implementations, performing no operation and thus permitting the wireless device to join the first telecommunications network.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing device connections in a first telecommunications network, the method comprising:
   receiving a handover connection request from a wireless device via a second telecommunications network;
   requesting an allowlist from a database associated with the first telecommunications network;
   determining, based on a content of the handover connection request and the allowlist, whether the wireless device is capable of performing an enhanced 911 (E-911) technique associated with the first telecommunications network;
   comparing a Type Allocation Code (TAC) for the wireless device to the allowlist;
   in response to a determination that the TAC is not present in the allowlist, determining that the wireless device is not capable of performing the E-911 technique; and
   in response to a determination that the wireless device is not capable of performing the E-911 technique, performing a denial operation with regard to the wireless device.

2. The method according to claim 1, wherein the first telecommunications network is voice-over-data-only network.

3. The method according to claim 1, wherein the denial operation includes deregistering the wireless device from the first telecommunications network.

4. The method according to claim 1, wherein the denial operation includes transmitting an error code to the second telecommunications network.

5. The method according to claim 1, wherein the handover connection request includes an International Mobile station Equipment Identity and Software Version number (IMEISV).

6. The method according to claim 5, further comprising:
   comparing a software version identifier included in the IMEISV to the allowlist; and
   in response to a determination that the software version identifier is not present in the allowlist, determining that the wireless device is not capable of performing the E-911 technique.

7. The method according to claim 1, further comprising:
   in response to a determination that the wireless device is capable of performing the E-911 technique, accepting the handover connection request.

8. The method according to claim 1, wherein the first telecommunications network and the second telecommunications network are operated by different network operators.

9. A system for managing device connections in a first telecommunications network, the system comprising:
   a first access node corresponding to the first telecommunications network; and
   at least one electronic processor operatively coupled to the first access node, the at least one electronic processor configured to perform operations including:
   receiving a handover connection request from a wireless device via a second access node corresponding to a second telecommunications network,
   requesting an allowlist from a database associated with the first telecommunications network,
   determining, based on a content of the handover connection request and the allowlist, whether the wireless device is capable of performing a an enhanced 911 (E-911) technique associated with the first telecommunications network, comparing a Type Allocation Code (TAC) for the wireless device to the allowlist,
   in response to a determination that the TAC is not present in the allowlist,
   determining that the wireless device is not capable of performing the E-911 technique, and
   in response to a determination that the wireless device is not capable of performing the E-911 technique, performing a denial operation with regard to the wireless device.

10. The system according to claim 9, wherein the first telecommunications network is voice-over-data-only network.

11. The system according to claim 9, wherein the denial operation includes deregistering the wireless device from the first telecommunications network.

12. The system according to claim 9, wherein the denial operation includes transmitting an error code to the second telecommunications network.

13. The system according to claim 9, wherein the operations further include:
   comparing a software version identifier included in the handover connection request to the allowlist; and in response to a determination that the software version identifier is not present in the allowlist, determining that the wireless device is not capable of performing the E-911 technique.

14. A processing node in a first telecommunications network, the processing node being configured to perform operations comprising:

receiving a handover connection request from a wireless device via a second telecommunications network;

requesting an allowlist from a database associated with the first telecommunications network;

determining, based on a content of the handover connection request and the allowlist, whether the wireless device is capable of performing an enhanced 911 (E-911) a technique associated with the first telecommunications network;

comparing a Type Allocation Code (TAC) for the wireless device to the allowlist;

in response to a determination that the TAC is not present in the allowlist, determining that the wireless device is not capable of performing the E-911 technique; and in response to a determination that the wireless device is not capable of performing the E-911 technique, performing a denial operation with regard to the wireless device.

15. The processing node according to claim 14, wherein the first telecommunications network is voice-over-data-only network.

16. The processing node according to claim 14, wherein the denial operation includes deregistering the wireless device from the first telecommunications network and/or transmitting an error code to the second telecommunications network.

17. The processing node according to claim 14, wherein the allowlist includes a list of approved software versions associated with types of wireless devices that are capable of performing the E-911 technique.

* * * * *